(12) United States Patent
Chatterjee et al.

(10) Patent No.: US 9,311,211 B2
(45) Date of Patent: Apr. 12, 2016

(54) APPLICATION PERFORMANCE MEASUREMENT AND REPORTING

(75) Inventors: Swarup Chatterjee, Kolkata (IN); Kallol Saha Chowdhury, Kolkata (IN); Somnath Sengupta, Kolkata (IN)

(73) Assignee: Tata Consultancy Services Limited, Mubai, Maharashtra (IN)

(*) Notice: Subject to any disclaimer, the term of this patent is extended or adjusted under 35 U.S.C. 154(b) by 721 days.

(21) Appl. No.: 13/407,572

(22) Filed: Feb. 28, 2012

(65) Prior Publication Data

US 2013/0030764 A1 Jan. 31, 2013

(30) Foreign Application Priority Data

Jul. 28, 2011 (IN) .......................... 2149/MUM/2011

(51) Int. Cl.
  *G06F 15/00* (2006.01)
  *G06F 11/34* (2006.01)
  *G06F 15/02* (2006.01)

(52) U.S. Cl.
  CPC ........ *G06F 11/3409* (2013.01); *G06F 11/3452* (2013.01); *G06F 11/3414* (2013.01); *G06F 15/02* (2013.01); *G06F 15/0216* (2013.01)

(58) Field of Classification Search
  CPC ............ G06F 11/3409; G06F 11/3414; G06F 11/3433; G06F 11/3452; G06F 15/00; G06F 15/0208; G06F 15/0225; G06F 15/0275; G06F 15/0216
  USPC ........................................................ 702/182
  See application file for complete search history.

(56) References Cited

U.S. PATENT DOCUMENTS

| 6,356,859 | B1* | 3/2002 | Talbot ................. G06F 11/3414 702/119 |
| 6,567,767 | B1* | 5/2003 | Mackey .............. G06F 11/3419 702/182 |
| 6,671,829 | B2* | 12/2003 | Kaler et al. ..................... 714/39 |
| 6,970,805 | B1* | 11/2005 | Bierma ............... G06F 11/3433 702/182 |
| 7,870,244 | B2* | 1/2011 | Chong ................ G06F 11/3006 370/232 |
| 2003/0204789 | A1 | 10/2003 | Peebles et al. |
| 2004/0064293 | A1* | 4/2004 | Hamilton ............ G06F 11/3409 702/182 |
| 2005/0091002 | A1* | 4/2005 | Krissell ............... G06F 11/3409 702/182 |
| 2011/0138368 | A1 | 6/2011 | Krauss |
| 2011/0173199 | A1 | 7/2011 | Heisig et al. |

OTHER PUBLICATIONS

European Patent Office Communication enclosing Extended European Search Report for corresponding European Patent Application No. 12157138.4, 10 pages, (Apr. 8, 2013).

\* cited by examiner

*Primary Examiner* — John Breene
*Assistant Examiner* — Lynda Dinh
(74) *Attorney, Agent, or Firm* — Blakely, Sokoloff, Taylor & Zafman LLP

(57) ABSTRACT

Systems and methods related to performance measurement and reporting are described. In one method, a first application is profiled in a first profiling session to generate a first parameter dataset related to performance of segments of the first application. A session report is created based on the first parameter dataset. Further, based in part on the session report, comments for one or more of the segments of the application are received. A consolidated report is then generated based on the first parameter dataset and the comments.

14 Claims, 3 Drawing Sheets

APPLICATION PERFORMANCE MEASUREMENT AND REPORTING

TECHNICAL FIELD

The present subject matter relates to software profiling and, particularly but not exclusively, to systems and methods for performance measurement and reporting for software applications.

BACKGROUND

Performance measurement of a software application is generally carried out to determine how various components of the software application perform under various workload conditions. The performance measurement may be conducted at various stages in the lifecycle of the software application, including during development, testing, profiling and monitoring. It is also used to validate and verify other attributes of the software application, such as scalability, reliability and resource usage. Generally, the performance of the software application is measured based on various performance parameters for example, memory statistics, processor statistics, network statistics, thread statistics, response time, etc. Such performance measurement is usually carried out by an application team and associated stakeholders.

The user conducting the performance measurement then analyzes the measurement results and may provide suggestions to the application team. The suggestions can relate to various aspects of the application, the hardware setup, the runtime conditions, and the like. Based on the measurement results and the suggestions, the application team may take further steps as required.

Sometimes, implementing a suggestion to improve one performance parameter may degrade the performance of the application with respect to another performance parameter. Hence a user may again measure the various performance parameters and send suggestions for improving the performance. This cycle of giving suggestions and measuring performance of a software application usually continues till the performance parameters of the software application fall within a pre-specified acceptable range.

SUMMARY

This summary is provided to introduce concepts related to systems and methods for performance measurement and reporting, and the concepts are further described below in the detailed description. This summary is neither intended to identify essential features of the claimed subject matter nor is it intended for use in determining or limiting the scope of the claimed subject matter.

In one implementation, a parameter dataset related to segments profiled in an application is generated and a session report is created based on the parameter dataset. Comments are received for one or more of the segments, based in part on the session report. A consolidated report is generated based on the parameter dataset and the comments.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
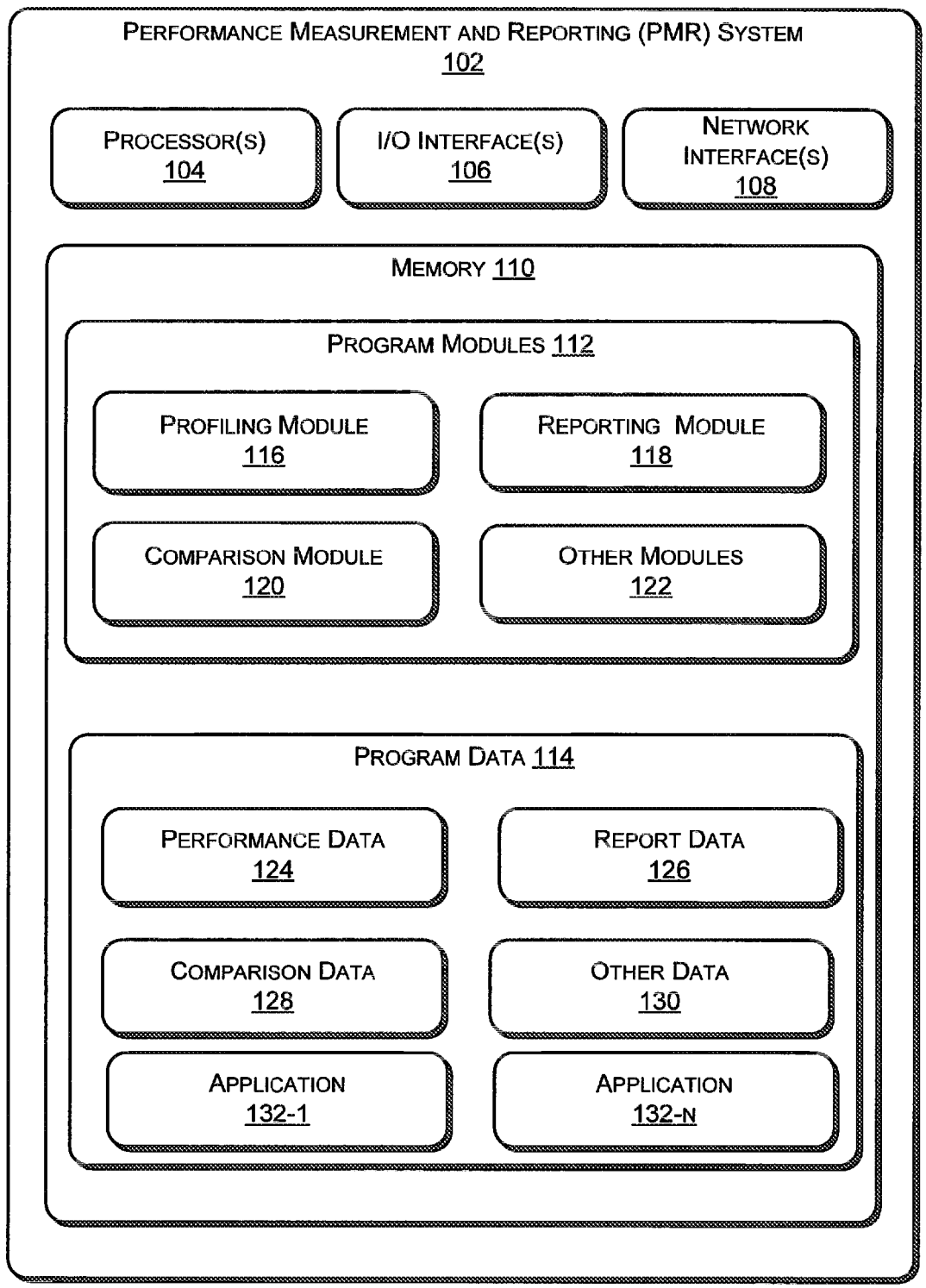
FIG. 1 illustrates an implementation of a performance measurement and reporting system, in accordance with an embodiment of the present subject matter.

Systems and methods for performance measurement and reporting are described herein. The systems and methods can be implemented in a variety of computing systems. The computing systems that can implement the described method(s) include, but are not restricted to, mainframe computers, workstations, personal computers, desktop computers, minicomputers, servers, multiprocessor systems, laptops and the like.

Performance measurement of a software application is done for various reasons including quality assurance and to verify that the application satisfies business, functional and technical requirements, and works as expected. Software application has been interchangeably referred to as application hereinafter. The performance measurement may be conducted at any stage in an application's lifecycle, including during development, testing, profiling and monitoring of the application. Generally, the performance is measured based on various performance parameters, such as processor utilization, memory utilization, network utilization, input-output utilization, database queries statistics, response time related statistics, session related statistics, throughput statistics, process thread statistics, and queue related statistics. It will be understood that this is an indicative list of the performance parameters and is not meant to be exhaustive.

The user conducting the performance measurement then analyzes the measurement results and may provide suggestions, for example, to the application team if the performance parameters lie above or below a pre-specified range. The suggestions can relate to, for example, the application or the hardware or the runtime conditions. For this, the performance parameters are usually recorded as screen snapshots and the suggestions are provided in an independent text or spreadsheet document. Based on the performance measurement results and the suggestions of the user, appropriate actions can be taken so as to meet the pre-specified acceptable range.

Sometimes, an action taken to improve one performance parameter may degrade the performance of the application with respect to another performance parameter. For example, in an attempt to improve the response time of the application, the memory utilization of the application may have increased. Hence, the application may be profiled again in a different session, the measurements of various performance parameters may be recorded, and suggestions may be provided for further modifications, if required. It will be understood that a profiling session refers to a duration over which the performance of the application is measured. This cycle of measuring the performance of the application and providing suggestions usually continues iteratively till the performance parameters of the application fall within the pre-specified acceptable range.

As mentioned above, conventionally, the suggestions made after performance measurement are not recorded or stored systematically, thus making it difficult for diagnosing performance issues at a later stage. Moreover, to compare the performance of an application between two profiling sessions, the screen snapshots have to be manually compared. The profiling sessions may differ in various aspects, such as in application versions, hardware setup, runtime conditions, session timings and session durations. Session timing is used to refer to the time, during the execution of the application, at which the profiling session is conducted. For example, the profiling session may be conducted when the application has just started running or after the application has been running for a given amount of time. Session duration is used to refer to the time duration for which the profiling session is conducted. Since there can be multiple reasons for which performance measurements differ over different profiling sessions, as discussed herein, it becomes difficult to analyze performance issues manually.

For example, consider a case where results of two profiling sessions are compared, where the profiling sessions correspond to performance measurement of different versions of a software application. If there is a performance issue related to memory utilization in the eleventh version of the software, it would be difficult to analyze from which previous version the performance issue might have originated, what were the actions taken in response to that, etc. In the above example, a processor utilization optimization in the third version might have been the root cause of an increase in memory utilization and over various optimizations in subsequent versions; the memory utilization may have exceeded the pre-specified acceptable range in eleventh version.

Using conventional systems and methods of performance measurement, it would be very difficult and cumbersome to detect the cause of the performance issue in the application as there is no direct way of comparing performance measurement results of two or more profiling sessions simultaneously. Further, in the absence of documentation of the suggestions and of corresponding actions taken, it becomes difficult to determine the cause of the performance issue.

In another example, the performance of an application may vary based on the session timing, i.e., the time at which the profiling session occurred and measurements were taken. For example, if an application uses a caching technique for quick data recovery, the performance of the application would vary over time as the cache gets populated, and would reach a steady state once the application has been running for some time. In such a case, to compare the performance measurement results of two profiling sessions that vary in the session timing also requires tedious manual comparison.

In yet another example, the performance of an application may vary due to the runtime conditions under which the performance is measured. For example, the performance could vary based on the operating environment used, size of input data, number of iterations to be performed, and the like. In such a scenario, again, manually comparing the performance measurements across multiple sessions having different runtime conditions is tedious.

In the present subject matter, systems and methods of application performance measurement and reporting are proposed. In an embodiment of the proposed system of performance measurement and reporting, the system has a provision for users, such as various stakeholders, to record comments and suggestions for individual segments of the software application and to associate the comments with the corresponding segments. The system is also configured to generate consolidated measurement results and analysis reports, including comments from the users, in various file formats. These measurement results and reports may be used by other stakeholders of the application. Further, various actions can be taken based on the recorded recommendations, to alter or improve the performance of the application.

In one implementation, the system also facilitates comparison of the performance parameters across different profiling sessions. For example, the system identifies segments common to the a first application profiled in a first session and a second application profiled in a second session, compares performance parameters corresponding to the common segments, and generates a comparison report. It will be understood that the first and second applications may be the same or different versions of an application. Similarly, the first and second profiling sessions may have the same setup, for example, in hardware configuration or runtime conditions or may differ in the setup. The comparison report may include parameters such as segment execution count, total cumulative response time, and average response time of the common segments. The system thus facilitates comparison of measurement results of two or more sessions simultaneously, and helps in diagnosing the source of performance issues in the software application.

While aspects of systems and methods for performance measurement and reporting can be implemented in any number of different computing systems, environments, and/or configurations, the embodiments are described in the context of the following examples of system architecture(s).

EXEMPLARY SYSTEMS

FIG. 1 illustrates a performance measurement and reporting system 102 for performance measurement of an application, according to an embodiment of the present subject matter. The performance measurement and reporting system 102 is also referred to as PMR system 102 hereinafter. The PMR system 102 may be implemented as any of a variety of conventional computing devices, including, a server, a desktop personal computer, a notebook, a portable computer, a workstation, a mainframe computer, a mobile computing device, or a laptop.

In said embodiment, the PMR system 102 includes one or more processor(s) 104, Input/Output (I/O) interfaces 106, network interfaces 108, and a memory 110 coupled to the processor 104. The processor 104 may be implemented as one or more microprocessors, microcomputers, microcontrollers, digital signal processors, central processing units, state machines, logic circuitries, and/or any devices that manipulate signals based on operational instructions. Among other capabilities, the processor 104 is configured to fetch and execute computer-readable instructions and data stored in the memory 110.

The I/O interfaces 106 may include a variety of software and hardware interfaces, for example, interface for peripheral device(s) such as a display unit, a keyboard, a mouse, an external memory, a printer, etc. The network interfaces 108 may enable the PMR system 102 to communicate with other computing devices and peripheral devices, such as web servers, and external databases over a network. The network interfaces 108 may facilitate multiple communications within a wide variety of protocols and networks, such as wired networks, e.g., LAN, cable, etc., and/or wireless networks, e.g., WLAN, cellular, satellite, etc.

In one implementation, the PMR system 102 can be connected to a public network or a company network including multiple office personal computers, laptops, various servers, such as blade servers, databases and other computing devices. In another implementation, the PMR system 102 can be connected to a private network or a home network with a limited number of personal computers and laptops. In yet another implementation, the PMR system 102 can be a stand-alone system.

The memory 110 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 110 includes program modules 112 and program data 114.

The program modules 112 include routines, programs, objects, components, data structures, etc., which perform particular tasks or implement particular abstract data types. The program modules 112 further include a profiling module 116, a reporting module 118, a comparison module 120 and other modules 122. The other modules 122 may include programs or coded instructions that supplement applications and functions on the PMR system 102, for example, programs in the operating system.

The program data 114, amongst other things, serves as a repository for storing data processed, received, and generated by one or more of the program modules 112. The program data 114 includes performance data 124, report data 126, comparison data 128, and other data 130. The other data 130 may include data generated as a result of the execution of one or more modules in the program modules 112, such as the other modules 122. In addition, the program data 114 may include applications 132-1 . . . 132-n, as will be explained below.

In operation, the profiling module 116 can access one or more of the applications 132-1, 132-2, . . . 132-n, collectively referred to as applications 132, for performance measurement. The profiling module 116 may receive the applications 132 through the I/O interfaces 106, such as from a compact disk (CD) drive, or the applications 132 may be accessed over a network or from program data 114. For the purposes of illustration, the applications 132 have been shown as being stored in program data 114. It will however be understood that the applications may alternatively be a part of program modules 112 or may be hosted on an external storage device or another computing device.

In one implementation, the profiling module 116 accesses an application, for example, the application 132-1 for performance measurement and reporting. The application 132-1 typically includes multiple segments, such as methods, procedures, functions, and other parts of the code. The profiling module 116 then profiles the application 132-1 in a profiling session, say a first profiling session. It will be understood that a profiling session refers to a duration over which the performance of an application is measured.

For profiling the application 132-1, the profiling module 116 runs the application 132-1 under various conditions and measures performance parameters for the segments executed in the first profiling session, to obtain a parameter dataset. The performance parameters may include one or more metrics, such as CPU statistics, memory statistics, network statistics, 110 statistics, database query statistics, response time statistics, session related statistics, throughput statistics, thread statistics, system process related statistics, and queue related statistics. It will be understood that this is an indicative list of the performance parameters and is not meant to be exhaustive or limiting. The profiling module 116 can store the measured parameter dataset corresponding to the different segments of the application 132-1 in performance data 124.

The reporting module 118 then generates a session report that provides a summary of the parameter dataset for the different segments. For example, the session report may include segment execution count, cumulative response time, average response time of each segment, etc. The session report may be stored in report data 126.

Further, the reporting module 118 provides the session report to a user through a user interface, for example, a display device. In another case, the reporting module 118 may also provide the session report as an output file or in any other format, such as portable document format (PDF), spreadsheets, tabular format, charts or in any format defined by the user. In yet another case, in the session report, the reporting module 118 can highlight or use any other technique to indicate the segments for which one or more performance parameters lie outside a pre-specified range. The pre-specified range may be pre-stored, for example in the performance data 124, or may be input by the user, for example before profiling. It will be understood that the pre-specified range may vary from session to session based on the application being profiled and the technical specifications of the application.

Once the session report has been provided to the user, the reporting module 118 can prompt the user to provide comments or recommendations for altering or improving the performance of one or more of the segments of the application 132-1. The comments can relate to one or more of a hardware setup, runtime conditions, a part of the first application, session timing and a duration of the session.

The comments entered by the user through the I/O interfaces 106 are associated with the corresponding segments and saved with the parameter dataset in the performance data 124. In one implementation, multiple users can provide comments on the same session report, and the various comments can be saved with the parameter dataset. In such a case, the comments provided by the various users may also be marked using, for example, a user name, color coding, etc. Further, the comments received from the users can be visually differentiated based on aspects, such as a user name and a network ID. The reporting module 118 then generates a consolidated report including both the parameter dataset and the recorded comments. The consolidated report is also stored in report data 126, and can be then used, for example, by the application team that is working on the application 132-1.

Based on the session report and the user comments, various actions to be taken may be decided upon, for example, actions related to a code of the application 132-1, a hardware setup, runtime conditions, session timing and duration of the session. The application is then again sent for profiling, for example, as application 132-2. It will be understood that the application 132-2 may be the same or a different version of the application 132-1. The profiling module 116 again profiles the application 132-2, in a second session, and generates a second parameter dataset as described before. Based on the actions decided upon, the second profiling session can differ from the first profiling session in one or more of a hardware setup, runtime conditions, session timing and duration of the session. Further, as aforementioned, the reporting module 118 can generate the session report and, if required, the consolidated report including user comments for the application 132-2. This process of profiling and taking actions can be carried out iteratively until the performance of the application conforms to specified requirements.

In one implementation, the user can choose to directly compare the parameter datasets generated in the two profiling sessions during the profiling of the two applications 132-1 and 132-2. In this case, the comparison module 120 identifies the segments common to applications 132-1 and 132-2, and compares the parameter datasets for the common segments. The reporting module 118 then generates a comparison report for the common segments based on the compared parameter datasets.

Further, the reporting module 118 can selectively highlight the parts of the parameter datasets that are unfavorable or have changed in one session as compared to the other. For example, the first session corresponding to the application 132-1 may have higher memory usage than the second session corresponding to the application 132-2, but may have lesser response time. Hence, in the comparison report, the reporting module 118 can highlight the memory usage statistics for the first session and the response time statistics for the second session for ready reference by the user.

In another implementation, a user can choose to compare profiling results from multiple sessions, which may correspond to profiling of different versions of an application or different hardware setup or different runtime conditions or different session timings or different session durations or a combination of these. In one case, the comparison module 120 identifies common segments across the applications profiled in the multiple sessions and compares the parameter datasets for the common segments. In another case, the comparison module 120 identifies the common segments and prompts the user to indicate which of the common segments need to be compared. The comparison module 120 then compares the parameter datasets for the indicated common segments.

Once the comparison module 120 compares the parameter datasets, the reporting module 118 can generate a comparison report in a manner similar to that discussed earlier. The comparison report can also include comparative graphs and selective highlighting of parts of the parameter datasets that have improved, deteriorated or changed over the multiple sessions. In one implementation, the comparison report can also include a memory graph so that a user can relate the changes in the parameter dataset with application memory usages. Further, in case one or more of the multiple sessions were profiled earlier by the profiling module 116 and user comments were recorded, the comparison report can include the comments associated with the common segments in one or more of the earlier sessions. Thus a user can directly compare profiling results from multiple sessions, study the earlier comments and analyze the effect of the various actions that were taken across the sessions.

Figure 2:
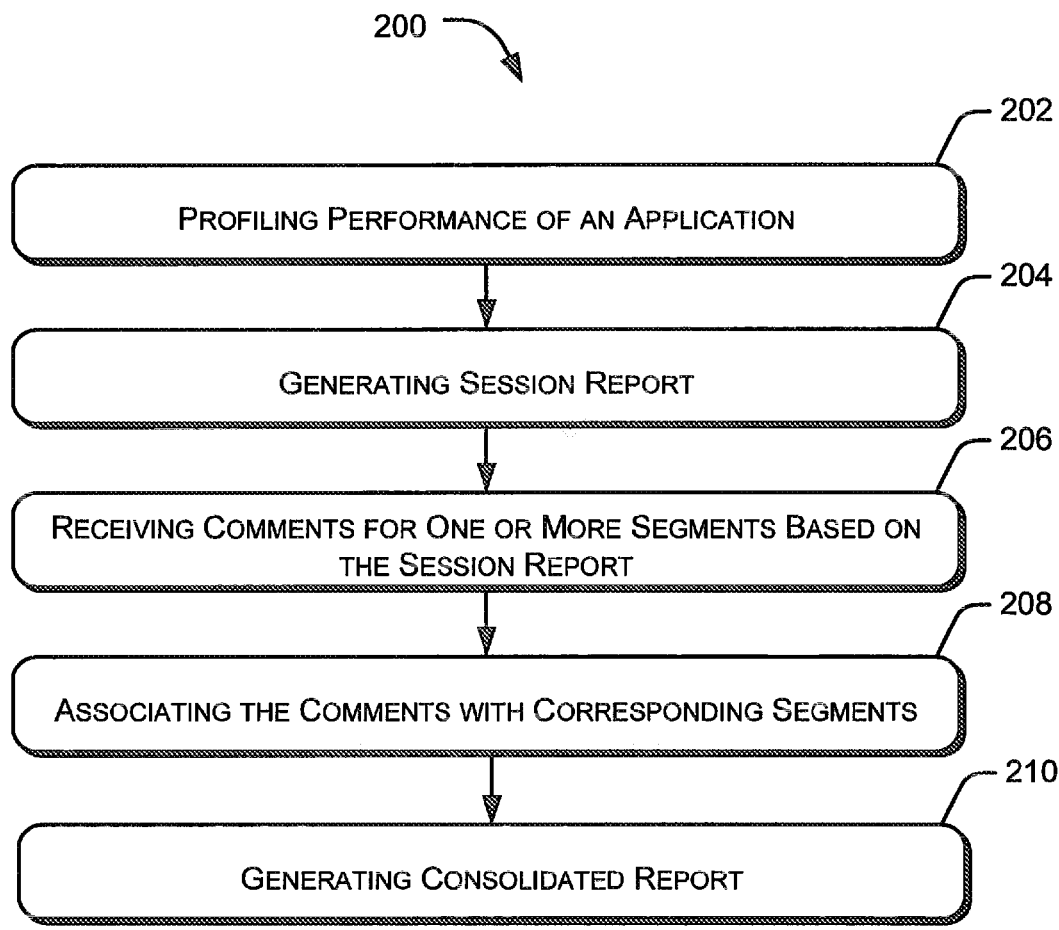
FIG. 2 illustrates a method for performance measurement and reporting, in accordance with an embodiment of the present subject matter.
Figure 3:
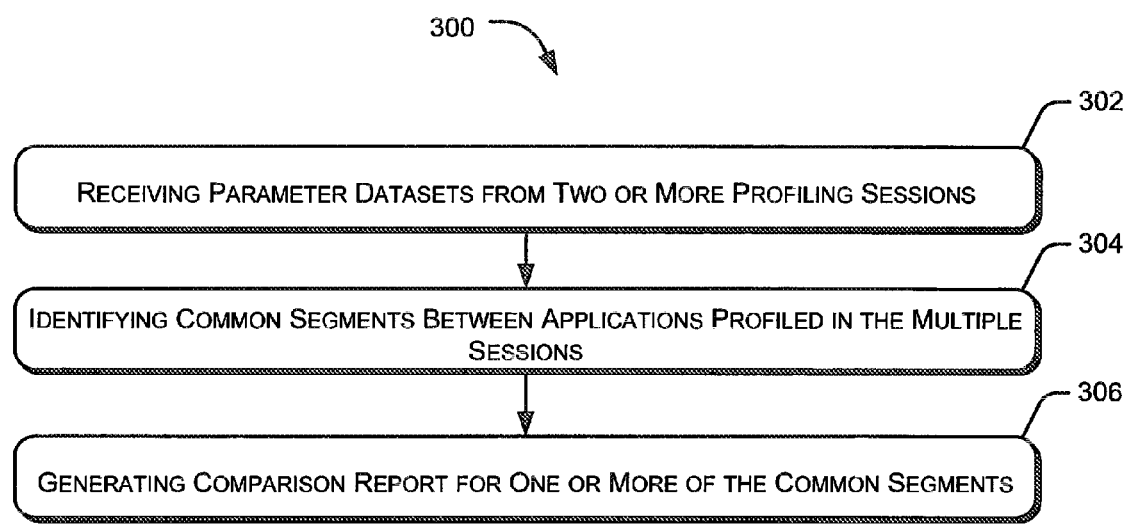
FIG. 3 illustrates a method for comparative performance measurement and reporting for an application, according to another implementation of the present subject matter.

FIG. 2 illustrates a method 200 for performance measurement and reporting, in accordance with an implementation of the present subject matter. FIG. 3 illustrates a method for comparative performance measurement and reporting, according to another implementation of the present subject matter.

The methods 200 and 300 may be described in the general context of computer executable instructions. Generally, computer executable instructions can include routines, programs, objects, components, data structures, procedures, modules, functions, etc., that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the methods, or alternative methods. Additionally, individual blocks may be deleted from the methods without departing from the spirit and scope of the subject matter described herein. Furthermore, the methods can be implemented in any suitable hardware, software, firmware, or combination thereof.

Referring to the method 200, at block 202, the performance of an application is profiled in a profiling session and a parameter dataset is generated. For example, the profiling module 116 can profile the performance of the application 132-1 by executing various segments of the application 132-1 and measuring performance parameters under various conditions to obtain the parameter dataset. The performance parameters can include metrics such as CPU statistics, memory statistics, network statistics, I/O statistics, database query statistics, response time statistics, session related statistics, throughput statistics, thread statistics, system process related statistics, and queue related statistics.

At block 204, the parameter dataset is summarized and a session report is generated. In one implementation, the reporting module 118 generates a session report that mentions the various segments in the application 132-1 and corresponding performance parameters, for example number of counts, total response time, average response time, maximum response time, and other statistics. The reporting module 118 may also highlight the segments for which one or more of the performance parameters lies outside a pre-specified acceptable range.

At block 206, user comments are received for improving the performance measurements by, for example, modifying one or more of the segments in the application or changing the hardware setup or runtime conditions or session timing or duration of the session. For example, the reporting module 118 may prompt the user to provide comments and may receive the inputs via, for example, a keyboard.

At block 208, the user comments are associated with the corresponding segments. In one implementation, the reporting module 118 associates the user comments with the corresponding segments and stores the associated comments in the performance data 124.

At block 210, a consolidated performance report, which includes both the parameter dataset related to various segments and the user comments, is generated. This consolidated report can be used by various stakeholders, such as software developers, database administrators, project leaders, etc. The consolidated report may be generated by the reporting module 118.

Further, performance metrics of multiple sessions, i.e., two or more sessions, can be directly compared, for example, as shown in an implementation in the method 300.

At block 302, parameter dataset is received from two or more profiling sessions of an application. In one implementation, the profiling module 116 can create 'n' number of sessions and generate parameter datasets for the 'n' sessions. The 'n' sessions may correspond to profiling of different versions of an application or different hardware setup or different runtime conditions or different session timings or different session durations or a combination of these.

At block 304, common segments between the applications profiled in the multiple sessions are identified and the parameter datasets for the common segments are compared. In one implementation, the comparison module 120 identities the common segments.

At block 306, a comparison report is generated using parameter datasets corresponding to one or more of the common segments. For example, the reporting module 118 may prompt the user to select one or more of the common segments and/or parameters for comparison. The reporting module 118 may then generate the comparison report for the selected segments, where the comparison report may include comparative graphs and selective highlighting of parameters that have changed over the multiple sessions. This comparison report can also include a memory graph so that a user can relate the changes in the parameter dataset with application memory usages. Further, in case user comments were recorded for one or more of the multiple sessions, the comparison report can include the comments associated with the selected segments.

Thus, the performance changes in an application over a period of time can also be effectively tracked and analyzed, thereby helping in creation and delivery of an efficient software application that meets the various business related, technical and functional requirements.

Although embodiments for performance measurement and reporting have been described in language specific to structural features and/or methods, it is to be understood that the invention is not necessarily limited to the specific features or methods described. Rather, the specific features and methods are disclosed as example implementations for the performance measurement and reporting systems and methods.

We claim:

1. A computer implemented method for application performance measurement and reporting, the method comprising a processor executing instructions stored in a memory to perform:
  generating, in a first profiling session, a first parameter dataset related to performance of an application, wherein generating the first parameter dataset comprises executing the segments in the first profiling session and measuring performance parameters to obtain the first parameter dataset, wherein the performance parameters comprise at least one of processor utilization, memory utilization, network utilization, input-output utilization, database queries statistics, response time related statistics, session related statistics, throughput statistics, process thread statistics, and queue related statistics;
  creating a session report based on the first parameter dataset;
  receiving comments for one or more of the segments of the application, based in part on the session report;
  providing a consolidated report based on the first parameter dataset and the comments;
  receiving a second parameter dataset corresponding to a second application profiled in a second profiling session;
  identifying common segments between a first application and a second application; and
  generating a comparison report for at least one of the common segments, based on the first parameter dataset and the second parameter dataset, wherein the comments relate to at least one of a hardware setup, runtime conditions, a part of the first application, a session timing and a duration of the session.

2. The computer implemented method as claimed in claim 1, further comprising:
  determining whether a performance parameter in the first parameter dataset lies outside a pre-specified range; and
  prompting one or more users to provide the comments based on a positive determination.

3. The computer implemented method as claimed in claim 2, wherein the comments received from the one or more users are visually differentiated based on at least one of a user name and a network ID.

4. The computer implemented method as claimed in claim 1, wherein the second application is at least one of the first application and a modified version of the first application.

5. The computer implemented method as claimed in claim 1, wherein the second profiling session differs from the first profiling session in at least one of a hardware setup, runtime conditions, a session timing and a duration of the session.

6. The computer implemented method as claimed in claim 1, wherein the comparison report includes at least one comment received based in part on the session report.

7. A system for performance measurement and reporting, the system comprising:
  a processor;
  a user interface;
  a network interface; and
  a memory coupled to the processor, the memory comprising:
    a profiling module configured to profile performance of a first application and generate a first parameter dataset related to segments executed in the first application, wherein the first parameter dataset is generated by executing the segments in the first profiling session and measuring performance parameters to obtain the first parameter dataset, wherein the performance parameters comprise at least one of processor utilization, memory utilization, network utilization, input-output utilization, database queries statistics, response time related statistics, session related statistics, throughput statistics, process thread statistics, and queue related statistics;
    a reporting module configured to,
      receive comments for altering performance of one or more of the segments; and
      generate reports based on at least one of the first parameter dataset and the comments;
    a comparison module configured to identify common segments between two or more applications, wherein the reporting module is further configured to generate a comparison report for comparing performance of one or more of the common segments, and wherein the comments relate to at least one of a hardware setup, runtime conditions, a part of the first application, a session timing and a duration of the session.

8. The system as claimed in claim 7, wherein the reporting module is further configured to: determine whether at least one data point in the first parameter dataset deviates from a pre-specified range; and indicate the deviation in a session report based on a positive determination.

9. The system as claimed in claim 7, wherein the reporting module is further configured to:
  determine whether the performance of one or more of the common segments has changed across the two or more applications; and
  indicate a change in the performance, in a comparison report, based on a positive determination.

10. A non-transitory computer-readable medium having embodied thereon a computer program for processor readable code stored thereon, the processor executing a method comprising:
  generating a first parameter dataset related to performance of an application in a first profiling session, wherein the generating the first parameter dataset comprises executing the segments in the first profiling session and measuring performance parameters to obtain the first parameter dataset, wherein the performance parameters comprise at least one of processor utilization, memory utilization, network utilization, input-output utilization, database queries statistics, response time related statistics, session related statistics, throughput statistics, process thread statistics, and queue related statistics;

obtaining a second parameter dataset corresponding to a second profiling session, wherein said second parameter dataset relates to a second application; and providing a comparison report based on the first parameter dataset and the second parameter dataset, wherein the comparison report further includes comments associated with an application profiled in at least one of the first profiling session and the second profiling session, wherein the comments relate to at least one of a hardware setup, runtime conditions, a part of the application, a session timing and a duration of the session.

11. The non-transitory computer-readable medium as claimed in claim 10, wherein the method further comprises:
creating a session report based on the first parameter dataset;
receiving the comments for one or more segments of the application, based in part on the session report; and
providing a consolidated report based on the user comments and the session report.

12. The non-transitory computer-readable medium as claimed in claim 10, wherein the second profiling session differs from the first profiling session in at least one of a hardware setup, runtime conditions, a session timing and a duration of the session.

13. The non-transitory computer-readable medium as claimed in claim 10, wherein the method further comprises:
identifying common segments between applications profiled in the first profiling session and the second profiling session; and
generating the comparison report for one or more of the common segments, based on the first parameter dataset and the second parameter dataset.

14. The non-transitory computer-readable medium as claimed in claim 13, wherein the generating the comparison report comprises indicating changes in performance parameters of the one or more of the common segments.

* * * * *